Nov. 20, 1956 J. COQUELET 2,771,506

TELEPRINTER SYSTEMS

Filed Feb. 1, 1955 3 Sheets-Sheet 1

Nov. 20, 1956 J. COQUELET 2,771,506

TELEPRINTER SYSTEMS

Filed Feb. 1, 1955 3 Sheets-Sheet 2

Nov. 20, 1956 J. COQUELET 2,771,506

TELEPRINTER SYSTEMS

Filed Feb. 1, 1955 3 Sheets-Sheet 3

United States Patent Office 2,771,506
Patented Nov. 20, 1956

2,771,506

TELEPRINTER SYSTEMS

Jules Coquelet, Jamioulx, Belgium, assignor to Ateliers de Constructions Electriques de Charleroi, Brussels, Belgium, a company of Belgium Application February 1, 1955, Serial No. 485,490
Claims priority, application France February 2, 1954
5 Claims. (Cl. 178—51)

The present invention relates to a teleprinter system in which the transmission of signals from transmitter to receiver is by a code formed of two units using a plurality of frequencies, i. e., one in which each character or signal is represented by two alternating currents of different frequency transmitted preferably successively. The generation of the different frequencies and the selection thereof upon reception are obtained preferably by tuned vibrating bodies, those at the receiver being synchronized with those at the transmitter.

The invention will be described with reference to a five unit code in which each signal is represented by one or more current pulses suitably arranged in the time allotted for each signal.

The use in radioelectric circuits by teleprinters of the two unit code gives greater reliability in transmission than the use of the five unit code. In fact, the time occupied by each unit in the case of the two unit code can be almost double that occupied by each unit in the case of the five unit code.

According to the present invention a teleprinter system allowing the transmission of thirty-two different signals is characterized in that on the one hand, it permits, with a perforated strip of the type used in the five unit code, the transmission of signals by a two unit code, and moreover, it allows reproduction by the two unit receiving equipment of the five unit perforated strip, for retransmission by this process.

According to the invention, a five unit code is divided into two groups of three and two units respectively, each combination of two units being placed following each combination of three units, or vice versa. Furthermore, in the two unit code, using twelve frequencies, these twelve frequencies are divided into two groups of eight and four frequencies respectively. With each combination of three units of the five unit code, there is associated one frequency of the eight frequency group, and with each two unit combination of the five unit code there is associated one frequency of the four frequency group.

According to a preferred embodiment of the invention, the radio teleprinter system is further characterized in that:

1. At the sending station, an automatic transmitter interpreting a five unit perforated strip is equipped with feelers each one controlling a contact which is closed or open according to the presence or absence of perforation of the said strip, the said contacts activating relays and creating, in the case of the first three contacts, eight different patterns each of which establishes a route on the control circuits of a frequency generator, and in the case of the latter two contacts, four different patterns each establishing a route towards the control system of a frequency generator.

2. At the receiver there are provided five thyratrons associated with electromagnets controlling the perforation of a five unit strip, the reception of a frequency of the first group of eight frequencies causing all or some of the first three thyratrons to ignite and the reception of a frequency of the second group of four frequencies causing one or both of the other two thyratrons to ignite.

3. Further, the reception of a frequency of the first group of eight frequencies also causes the excitation of a relay controlling the anode voltage of the two latter thyratrons and on the other hand, the reception of a frequency of the second group of four frequencies causes the excitation of a relay, the function of which is to couple the printing mechanism to the printing magnets, and to remove and then restore the anode voltage of the first three thyratrons, thereby returning the system to its original condition.

4. The reception of the two frequencies corresponding to the absence of pulses in the two groups of thyratrons, in each case causes a supplementary thyratron to ignite and either excite a relay controlling the plate voltage on the second group of thyratrons, or excite the relay controlling the coupling of the printing mechanism as well as the voltage removal, followed by restoration of the anode voltage on the first group of thyratrons.

The attached drawings show, by way of non-limiting example, a method and system of transmission by teleprinters according to the present invention.

In said drawings,

Figs. 1*a* and 1*b* show in the form of charts the relationship between a two unit code utilizing twelve frequencies and a five unit code.

Figure 1A:
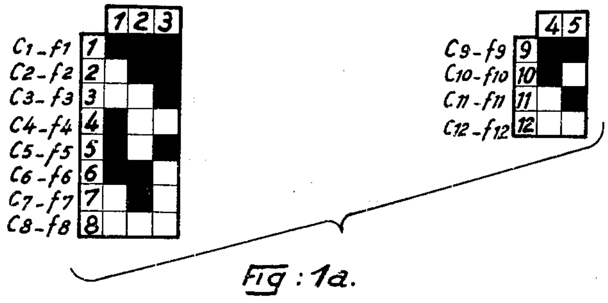

In Fig. 1*a*, five units are shown divided into two groups of three and two units respectively. For the three unit group eight combinations are possible; these are C1, C2 . . . C8. The black squares indicate the presence of current, while the white squares indicate the absence of current. For the two unit group, four combinations are possible: C9, C10, C11 and C12. If these combinations are used together by placing a combination of two units after a combination of three units, the thirty-two signals of the five unit code are thereby produced.

Consider now twelve frequencies, *f*1, *f*2 . . . *f*12, divided into two groups: a primary group of eight frequencies *f*1 to *f*8 and a second group of four frequencies, *f*9 to *f*12. Each combination C1 to C8 can correspond to a frequency selected in the first group of eight frequencies *f*1 to *f*8 and each combination C9 to C12 can correspond to a frequency selected in the second group of four frequencies *f*9 to *f*12. In other words, every signal of the five unit code, representing, for example, one letter, can correspond to the signal representing the same letter in a two unit code using twelve frequencies.

Figure 1B:
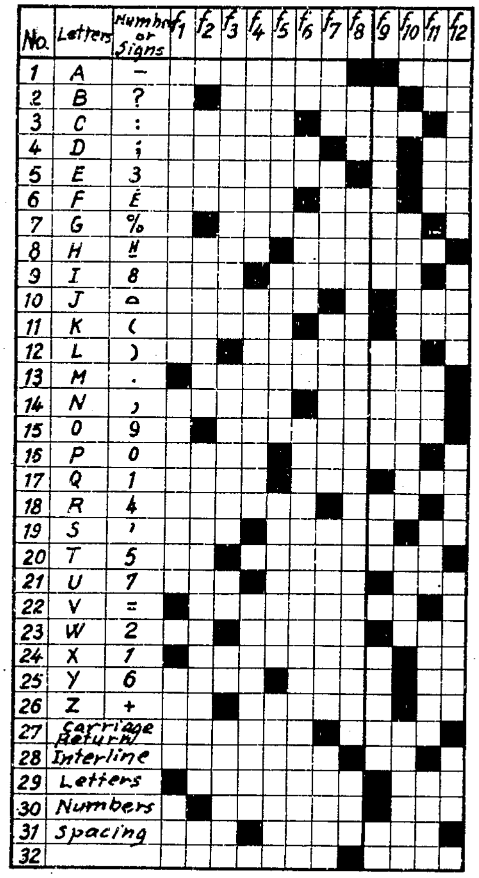

Fig. 1*b* shows an example of a two unit code using twelve frequencies: thirty-two signals can be transmitted by two alternating currents of different frequencies emitted successively, the first having a frequency selected in a group of eight frequencies *f*1 to *f*8, and the second having a frequency selected in a group of four frequencies *f*9 to *f*12.

Figure 2:
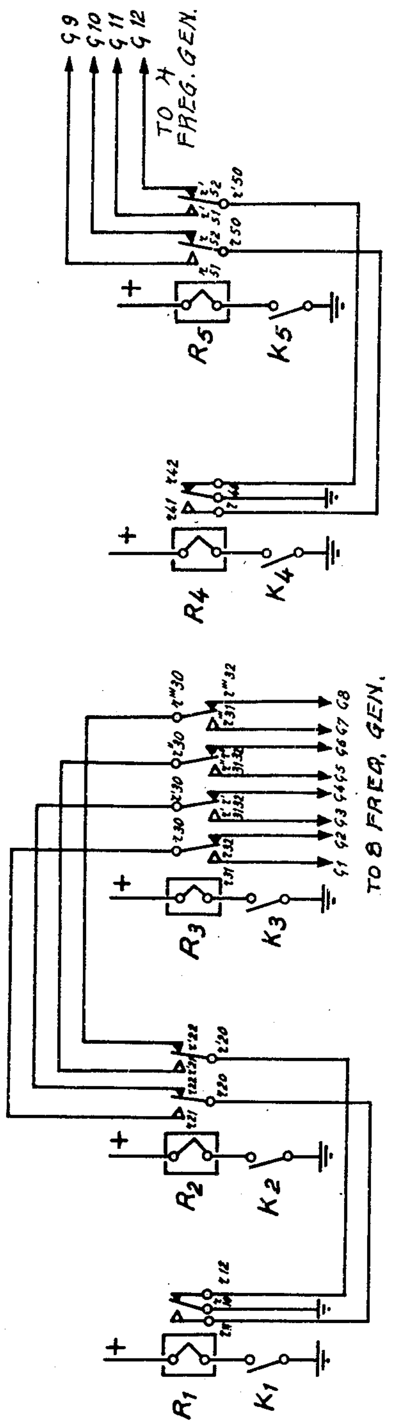
Fig. 2 shows one embodiment of a transmitting circuit according to the invention.

Fig. 2 shows a schematic diagram of a transmitter utilizing this correspondence between the two codes. The transmission of signals is accomplished by the two unit code from a five unit perforated strip. An automatic transmitter, not shown, interpreting the perforated strip is equipped with five feelers each controlling one of the contacts K1, K2, K3, K4 and K5. These contacts are open or closed according to the condition of perforation of the strip. Each contact is mounted in series with the coil of a relay, R1–R5. Thus contact K1 is in series with relay R1, contact K2 with relay R2, K3 with R3, K4 with R4 and K5 with R5. If we consider the first three relays, R1, R2 and R3, with R1 there is associated a two position commutator, r11 and r12; with R2 there are associated two position commutators, r21, r22 and r'21, r'22 and with R3 there are associated four two-position commutators, r31, r32; r'31, r'32; r''31, r''32 and r'''31, r'''32.

According to whether relay R1 is excited or not, i. e., according to whether contact K1 is opened or closed, the commutator associated with relay R1 is in position r11 or r12, and likewise for the commutators of relays R2 and R3.

All the commutators are intercollected as follows:

Positions r11 and r12 of the commutator associated with relay R1 are connected by leads to intermediate contacts r20 and r'20 of the two commutators associated with relay R2, the intermediate contact r10 being grounded.

Positions r21, r22, r'21, r'22 of the commutator relay R2 are connected to intermediate contacts r30, r'30, r''30 and r'''30 of the commutators associated with relay R3.

Positions r31, r32, r'31, r'32, r''31, r''32, r'''31, r'''32, of the commutators associated with relay R3 are each connected to a control circuit of one of eight frequency generators, G1, G2 . . . G8.

The position of the contacts K1, K2 and K3 can form eight different patterns. These eight patterns through the connections mentioned above, each establishes a route toward a control circuit of one of the generators, G1, G2 . . . or G8.

A similar analysis can be made considering the last two relays R4 and R5. Relay R4 is associated with a two-position commutator r41 and r42. To relay R5 are associated two position commutators, r51, r52 and r'51, r'52. According to whether relay R4 is excited or not, the commutator associated with it is in position r41 or r42, and similarly in the case of the commutators associated with relay R5. The positions r41 and r42 of the commutator associated with relay R4 are connected to intermediate contacts r50 and r'50 of the commutators associated with relay R5. Positions r51, r52, r'51 and r'52 of the commutators associated with relay R5 are connected to the control circuit of one of the four frequency generators G9 . . . G12.

The position of the contacts K4 and K5 can give rise to four different patterns. These four patterns, by means of the connections established, each establishes a route towards a control circuit of one of the generators G9 . . . G12.

Therefore to each group of five units of the perforated strip, identified by the automatic transmitter, there corresponds an emission of two frequencies, one in the group G1 to G8, the other in the group G9 to G12. Thus the emission is made in a two unit code.

Figure 3:
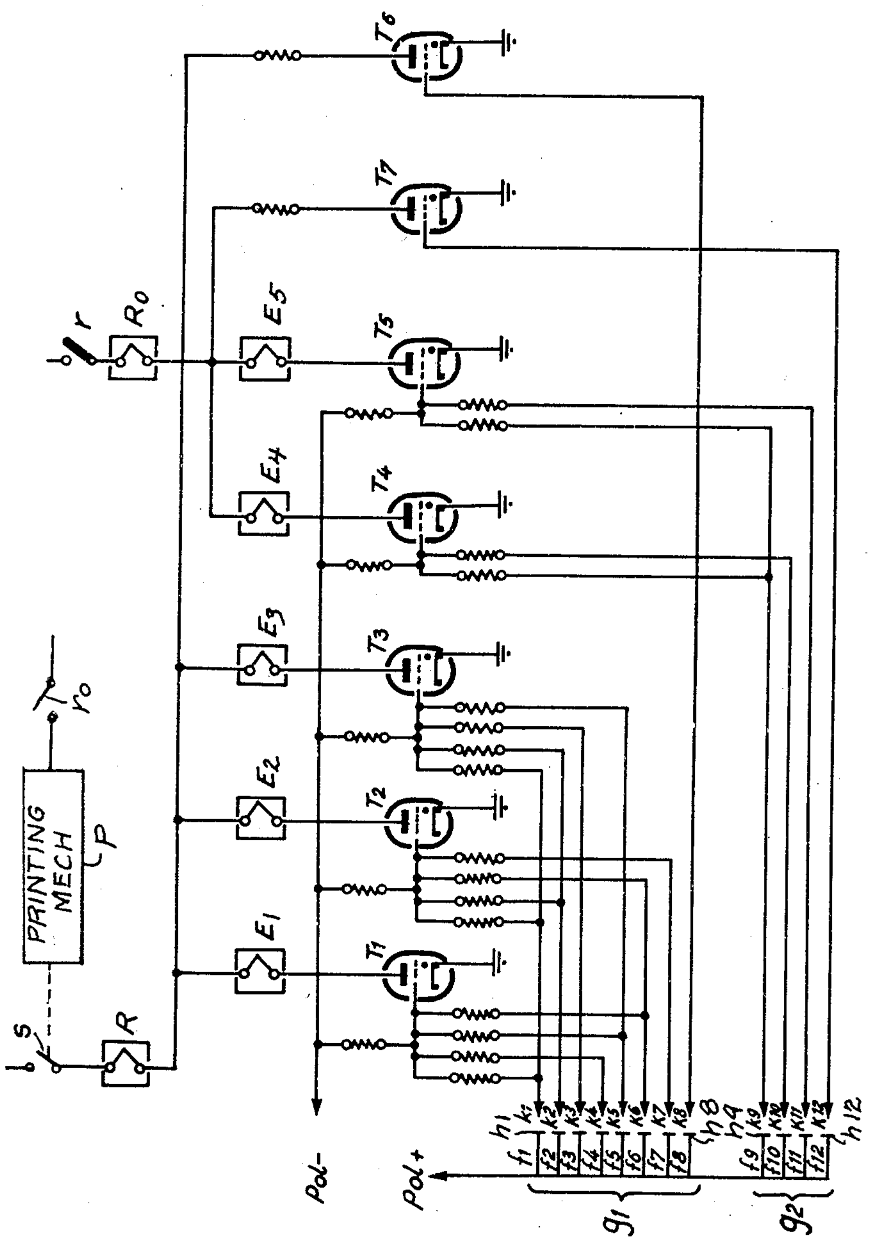
Fig. 3 shows one embodiment of a receiving circuit according to the invention.

Fig. 3 shows schematically the elements essential to an understanding of a receiver utilizing the correspondence between the five and two unit codes.

It is desirable to be able to use a system that enables easily reperforations, i. e., obtaining at the same time the ordinary printing of the message received and a strip perforated according to the five unit code. This strip can then be used for retransmission.

The receiver includes five control electromagnets, E to E5, each of which effects the representation of one of the units; these electromagnets, according to whether they are or are not excited, cause punching or no punching of the strip as well as the selection of the code bars of a printer (not shown).

Because there is transmitted the two unit code using twelve different frequencies F1 to F12, there are provided at the receiver, a set of twelve contacts k1 to k12, two of which close under the action of blades or reeds vibrating in response to the two frequencies representing the character transmitted. The link between these contacts and the five electromagnets E to E5 controlling the perforation of the five unit strip is through the five thyratrons T1, T2, T3, T4 and T5.

The twelve vibrating blades h1 to h12, as well as the contacts k1 to k12 associated therewith are subdivided into two groups g1 and g2 of eight blades and four blades respectively, synchronized with the groups of eight frequencies f1 to f8 and four frequencies f9 to f12. Each of the contacts K1 to K7 is connected by cables to the grid of one or more of the three thyratrons T1, T2 and T3. These connections are established on the basis of the charts in Figs. 1a and 1b. The contacts K8 to K11 are similarly connected to thyratrons T4 and T5.

A negative bias is applied to the grids of the thyratrons while a positive bias is applied to the vibrating blades. When a blade closes its contact, the positive bias is applied to the grid of one or more thyratrons according to the connections established, and thereby ignites one or more thyratrons. The triggering of the thyratrons corresponds to the desired perforation of the five unit strip, and to the required selection of the code bars of the printing groups.

The reception of one of the frequencies f1 to f8 also causes the excitation of a relay R with which is associated the interrupter r. When the relay R is excited, interrupter r closes. In other words, relay R applies high voltage to the thyratrons T4 and T5. Likewise, the reception of one of the frequencies f9 to f12 causes the excitation of a relay R0 which couples the printing mechanisms p to E—E5. This coupling, in turn, activates a device such as a cam (not shown) which successively cuts off the thyratrons T1, T2 and T3, and then restores the high voltage to the same thyratrons so as to return the system to its original condition, by means of a switch S.

According to the correspondence charts (Figs. 1a and 1b) between the two and five unit codes, the frequency f8 corresponds to the absence of pulses in the group of thyratrons T1, T2 and T3, and frequency f12 corresponds to the absence of pulses in the group of thyratrons T4 and T5. Therefore, the reception of these frequencies involves no triggering of thyratrons T to T5. Nevertheless it is useful to register the reception of these frequencies, if we wish to obtain a "positive" form of transmission, i. e., a type of transmission in which every character is represented by a signal and not merely by an absence of signal. If, for example, the system is such that the frequency f8 is not registered, there is no difference between two characters represented respectively by the combinations f4, f10 and f8, f10, if for some reason the frequency f4 is not received. The same is true with respect to f12. It will be understood that the teleprinter can be arranged to mark a fault and not a blank in the present arrangement in which the reception of f8 and f12 is registered, i. e., marked by a modification of the circuits.

To embody this "positive" transmission characteristic a thyratron T6 is associated with the contact k8 corresponding to the frequency f8 and a thyratron T7 is associated with k12 corresponding to frequency f12. The reception of the frequency f8, and the firing of the thyratron T6 causes the excitation of relay R. As explained above, the high voltage is therefore applied to thyratrons T4 and T5, preparing them to receive a frequency of the group f9 to f12. In this way the frequency f8 is in fact registered.

Likewise, the reception of the frequency f12, and the firing of thyratron T7 causes the excitation of relay R0, thereby coupling in the printing mechanism. In this way the frequency f12 is in fact registered.

The device according to the invention thus allows perfect correspondence between the two and five unit codes.

Since variations may be made in the foregoing constructions and different embodiments of the invention without departing from the scope of the invention, it is intended that the illustrated embodiments may not be considered in a limiting sense. It is aimed to define the scope of the invention in the following claims.

What I claim and desire to secure by Letters Patent is:

1. In a teleprinter system, an automatic tape transmitter having five contacts for sensing a tape perforated according to a five unit code, transmitting means connected to said contacts for producing in response to each five unit code group a first current having any one of eight different characteristics corresponding to three units of said code, and a second current having any one of four different characteristics corresponding to the other two units, means for receiving said first and second currents comprising twelve channels each including a tuned mechanically vibrating element for selecting a current having one of said characteristics, five electron tubes, a relay winding connected between the anode and cathode of each tube, means connecting said channels to the control electrodes of said tubes for controlling the biases of the control electrodes of three of said tubes selectively in response to said first current and the biases of the other two tubes selectively in response to said second current so that said tubes energize the relay windings corresponding to the transmitted code group, a voltage control relay has its winding connected in series with the anode of each of said three tubes, said relay having contact means for applying anode voltage to said two tubes, a sixth tube, said means for controlling the biases being connected to the control electrode of the sixth tube for controlling said tube in response to a characteristic of the first current representing the absense of a pulse in said three units, the anode of the sixth tube being connected to said winding of the voltage control relay, a printing and control relay having a winding connected in series with the anode of each of said two tubes for operating said printing mechanism.

2. A system according to claim 1, comprising a seventh tube, said bias controlling means being connected to the control electrode of said seventh tube for controlling said tube in response to a characteristic of the second current representing the absence of a pulse in said two units of the code, said winding of the printing control relay means being connected in series with the anode of the seventh tube.

3. A system according to claim 2, comprising means responsive to the printing and control relay means for removing and then applying anode voltage to said three tubes and said sixth tube and removing the anode voltage from said two tubes and said seventh tube after operation of said printing mechanism.

4. A system according to claim 3, wherein all of said tubes are thyratron tubes.

5. A system according to claim 1, wherein said transmitting means comprises five sending relays each connected in series with one of said five contacts, said relays being divided into a first group of three relays and a second group of two relays, a first relay of each group having one movable contact and two fixed contacts and each subsequent relay having a movable contact connected to each fixed contact of the preceding relay and two fixed contacts juxtaposed to each movable contact.

References Cited in the file of this patent

UNITED STATES PATENTS

| | | |
|---|---|---|
| 1,619,085 | Nyquist | Mar. 1, 1927 |
| 1,661,962 | Robinson | Mar. 6, 1928 |
| 2,459,904 | Watson | Jan. 25, 1949 |
| 2,534,354 | Keller | Dec. 19, 1950 |
| 2,603,705 | Van Duuren | July 15, 1952 |